UNITED STATES PATENT OFFICE.

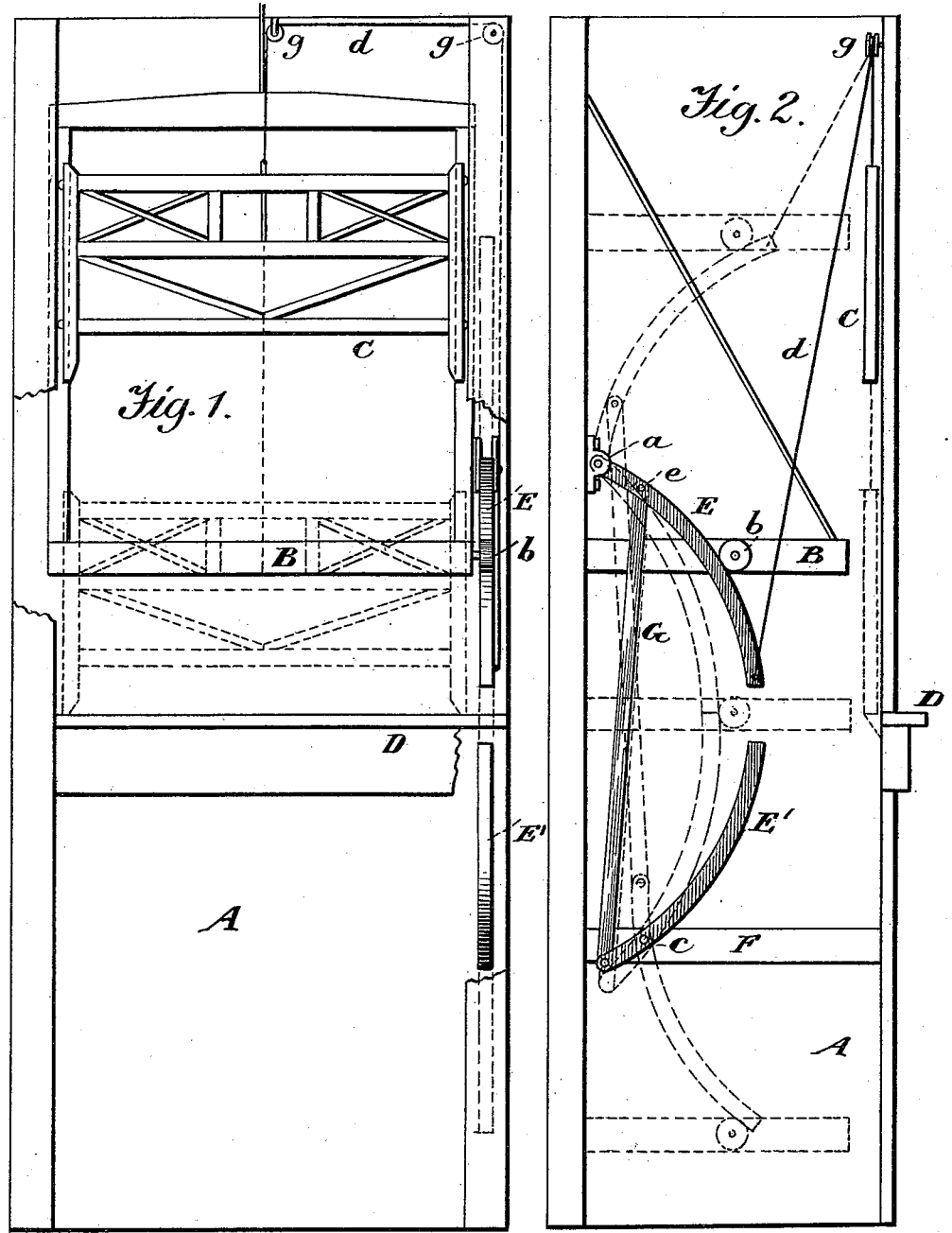

EPHRAIM LANDIS, OF PHILADELPHIA, PENNSYLVANIA.

ELEVATOR.

SPECIFICATION forming part of Letters Patent No. 463,632, dated November 24, 1891.

Application filed March 12, 1891. Serial No. 384,754. (No model.)

*To all whom it may concern:*

Be it known that I, EPHRAIM LANDIS, a citizen of the United States, residing at Philadelphia, in the county of Philadelphia and State of Pennsylvania, have invented certain new and useful Improvements in Elevators; and I do hereby declare the following to be a full, clear, and exact description of the invention, such as will enable others skilled in the art to which it appertains to make and use the same.

The invention relates to elevators the shafts of which are provided with safety-gates where the elevator is entered from the several floors of the building; and it consists in certain improvements in the construction of such gates and the operating mechanism of the same, as hereinafter described and claimed.

In the accompanying drawings, Figure 1 illustrates in front view an elevator provided with my improvements. Fig. 2 represents the same in side view.

A designates the elevator-shaft, and B the cage located therein and constructed to be raised and let down by means of a cord or chain.

C indicates a gate in position to close the entrance to the shaft from the floor D, the said gate being movable up and down, as hereinafter stated.

E and E' indicate two curved levers connected with the frame-work of the shaft, the lever E having one end pivoted therewith at $a$. The lever E' is located some distance below the lever E and is pivotally connected with a bar F of the frame at $c$, the point of connection being a short distance from the end of lever E, as shown.

G indicates a connecting-rod, the upper end of which is connected with lever at $e$ a short distance from the connection of the lever E with the frame. The lower end of the rod G is connected with the end of the lever E', which is near the connection $c$ of said lever with the bar F.

Connected with one edge of the base of the cage B is a roller $b$, which is in position to impinge and move against the outer or convex edge of the upper lever E when the cage descends and to impinge against the convex edge of the lever E' in the upward movement of said cage. A cord $d$ is connected with the free end of lever E and is passed over pulleys $g$ and connected with the gate C. The two curved levers and the rod G are so constructed and connected that when the cage B moves either upward or downward the free ends of the two curved levers are brought together, as indicated in dotted lines. As the cage moves upward from below, the roller $b$, impinging against the lever E', moves the latter toward the wall of the shaft, and by means of the connecting-rod G the upper lever E is actuated and makes a corresponding movement, so that the free ends of both levers are brought together and form a continuous track for the roller $b$, and the gate, being connected by a cord $d$ with the upper lever, is raised by the movement of the latter. As the gate rises the levers are gradually released, when the gate, descending by gravity, is closed and the levers separate and are brought to the positions indicated by dotted lines. When the cage descends from above, the roller $b$, moving downward against the upper lever E, in like manner produces a like movement of both levers and raises the gate.

The devices described are automatic in operation, the gate being opened and closed by either the upward or downward movement of the cage.

I claim—

In elevator mechanism, the gate of the elevator-shaft, combined with two curved levers E E', pivoted to frame-work, placed one above the other and adapted to fold together to form a continuous track, the rod G, connected with the lower lever at one end and with the upper lever near its pivoted end, the cord passing over pulleys and connected with the upper lever and gate, and an elevator-car provided with a roller adapted to travel on the track made by said levers, as and for the purpose set forth.

In testimony whereof I have affixed my signature in presence of two witnesses.

EPHRAIM LANDIS.

Witnesses:
JOSEPH KULP,
W. S. L. RHOADS.